Feb. 26, 1924.  
J. E. ASH ET AL  
1,485,010  
TOOL HOLDER FOR PNEUMATIC HAMMERS  
Filed Sept. 11, 1919
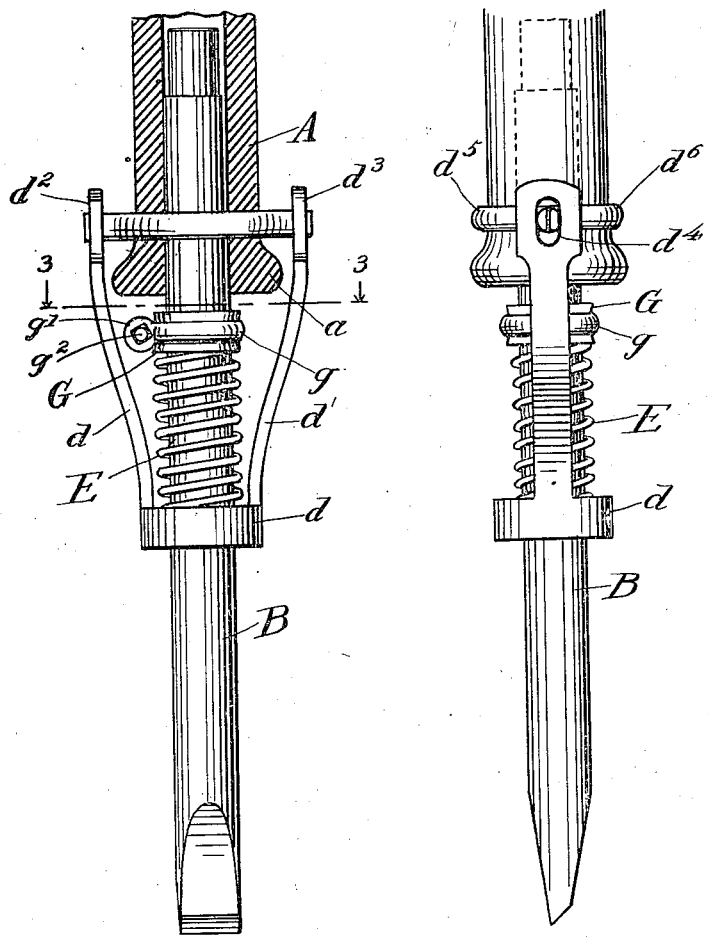
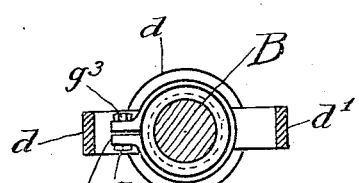

Patented Feb. 26, 1924.

1,485,010

UNITED STATES PATENT OFFICE.

JESSE EUGENE ASH, OF SILVER GROVE, AND JOHN MARSHALL CROWE, OF COVINGTON, KENTUCKY, ASSIGNORS TO SAID CROWE AND LOUIS K. DE BUS, OF CINCINNATI, OHIO.

TOOL HOLDER FOR PNEUMATIC HAMMERS.

Application filed September 11, 1919. Serial No. 323,087.

*To all whom it may concern:*

Be it known that we, JESSE E. ASH and JOHN MARSHALL CROWE, citizens of the United States of America, and residents of Silver Grove and Covington, in the counties of Campbell and Kenton and State of Kentucky, have invented a new and useful Improvement in Tool Holders for Pneumatic Hammers, of which the following is a specification.

Our invention relates to pneumatic hammers in which the tools are mounted removably and yieldably in place so that they may be readily interchanged, as they become dull, and protect the casing of the tool from the shock of any unopposed blow of the piston upon the tool.

The object of our invention is to provide a means for mounting the tool upon the piston cylinder which may readily be assembled, and be taken apart, does not slip, and does not mar the tool.

This object is attained by the means described in the specification and illustrated in the accompanying drawing, in which:—

Fig. 1 is a view in section of part of a piston cylinder, and in side elevation of a tool and a tool holder embodying our invention.

Fig. 2 is an elevation of the parts shown in Fig. 1, taken at right angles to the position shown in Fig. 1.

Fig. 3 is a sectional view taken upon line 3—3 of Fig. 1.

Referring to the parts,

The piston cylinder A has at its lower end a flange $a$. Tool B has a diameter to fit within the bore of the cylinder A. Upon the cylinder is removably mounted a bracket which comprises a spring supporting ring $d$, spring arms $d$, $d'$ secured at diametrically opposite points of the ring $d$ and terminating in enlarged ends $d^2$, $d^3$, which have central slots $d^4$, in which are seated the straightened ends of the semi-circular members $d^5$, $d^6$, of a divided collar, which is of a diameter to fit about the cylinder A and to rest upon the flange $a$. The divided collar and the spring arms are connected or disconnected by spreading the upper ends of the spring arms to enable the ends of the divided collar to enter the slots $d^4$ or to be released therefrom.

To support tool B upon the ring $d$, we employ a coiled spring E, and an abutment for the spring comprising a section of rubber hose G and a circular metallic clamp $g$, which has a lug $g'$ through which a bolt $g^2$ is passed. By tightening the nut $g^3$ the clamp binds the rubber tubing firmly upon the tool.

In use we have found that when the rubber hose G is clamped firmly upon the tool it remains securely in place under most severe usage of the tool, yet does not mar the circumference thereof, whereas a metal collar could not be held firmly in place by a clamp, and if held in place by set screws, splines or wedges, these means of fastening soon become battered and ineffectual to hold the collar, in place upon the tool.

We have found that the replacement of a dull tool by a new one is simply and quickly performed. The steps taken are to spread spring arms $d^2$, $d^3$ so as to release the bracket from the cylinder A; to slide the bracket and the spring off of the tool, to replace them upon a new tool upon which one of our elastic abutments has been clamped, then to insert the end of the tool into the bore of the cylinder to place the split ring around the cylinder and engage the ends of the split ring with the slots of the spring arms $d$, $d'$.

What we claim is:—

1. In an article of the class described the combination of a tool, an abutment consisting of a section of elastic tubing, and a clamp adapted to clamp the tubing around the tool.

2. In an article of the class described the combination of a tool, an abutment consisting of a section of rubber tubing and a circular clamp surrounding the section and binding it around the tool.

3. In a tool holder for pneumatic tools the combination of a bracket comprising a collar adapted to encircle the tool, spring arms and a ring adapted to surround the casing of the pneumatic tool, a section of rubber tubing adapted to surround the tool, a clamp adapted to clamp the rubber tubing upon the tool and a coiled spring, surrounding the tool and abutting the collar and the tube.

4. In a tool holder for pneumatic hammers the combination of a bracket, a split ring, a collar and means for securing the collar upon the tool, the bracket comprising a collar and spring arms with apertures in the ends, and the split ring comprising semicircular bands with ends adapted to be seated in the apertures in the arms, and a coiled spring surrounding the tool between the collars.

In testimony whereof, we have hereunto subscribed our names this 15th day of August, 1919.

JESSE EUGENE ASH.
JOHN MARSHALL CROWE.

Witnesses:
L. K. DE BUS,
C. H. LEMAN.